US 11,442,263 B2

United States Patent
Husemann et al.

(10) Patent No.: US 11,442,263 B2
(45) Date of Patent: Sep. 13, 2022

(54) METHOD AND DEVICES FOR DISPLAYING STEREOSCOPIC IMAGES

(71) Applicant: Carl Zeiss Microscopy GmbH, Jena (DE)

(72) Inventors: Christoph Husemann, Jena (DE); Lars Stoppe, Jena (DE); Tanja Teuber, Aalen (DE); Lars Omlor, Aalen (DE); Kai Wicker, Jena (DE); Enrico Geissler, Jena (DE); Senthil Kumar Lakshmanan, Erfurt (DE)

(73) Assignee: Carl Zeiss Microscopy GmbH, Jena (DE)

( * ) Notice: Subject to any disclaimer, the term of this patent is extended or adjusted under 35 U.S.C. 154(b) by 1074 days.

(21) Appl. No.: 16/074,247

(22) PCT Filed: Jan. 24, 2017

(86) PCT No.: PCT/EP2017/051414
§ 371 (c)(1),
(2) Date: Jul. 31, 2018

(87) PCT Pub. No.: WO2017/133925
PCT Pub. Date: Aug. 10, 2017

(65) Prior Publication Data
US 2021/0026126 A1 Jan. 28, 2021

(30) Foreign Application Priority Data

Feb. 4, 2016 (DE) .................... 10 2016 101 967.4

(51) Int. Cl.
*G02B 21/36* (2006.01)
*H04N 13/189* (2018.01)
(Continued)

(52) U.S. Cl.
CPC .......... *G02B 21/367* (2013.01); *G02B 21/14* (2013.01); *G02B 21/22* (2013.01); *H04N 13/156* (2018.05);
(Continued)

(58) Field of Classification Search
None
See application file for complete search history.

(56) References Cited

U.S. PATENT DOCUMENTS 5,835,264 A 11/1998 Tandler et al.
6,160,908 A 12/2000 Hakozaki
(Continued)

FOREIGN PATENT DOCUMENTS

DE 19507344 A1 10/1996
DE 202013011877 U1 10/2014
(Continued)

OTHER PUBLICATIONS

Liu et al., Real-time brightfield, darkfield, and phase contrast imaging in a light-emitting diode array microscope, Journal of Biomedical Optics. (Year: 2014).*
(Continued)

*Primary Examiner* — James M Anderson, II
(74) *Attorney, Agent, or Firm* — Myers Bigel, P.A.

(57) ABSTRACT

Various approaches in which an image-recording parameter is varied between a plurality of images of an object and a stereo image pair is displayed on the basis of the images recorded thus are described. Here, in particular, the image-recording parameter can be a focal plane or an illumination direction.

15 Claims, 4 Drawing Sheets

(51) Int. Cl.
*H04N 13/156* (2018.01)
*H04N 13/302* (2018.01)
*G02B 21/14* (2006.01)
*G02B 21/22* (2006.01)

(52) U.S. Cl.
CPC ......... *H04N 13/189* (2018.05); *H04N 13/302* (2018.05)

(56) References Cited

U.S. PATENT DOCUMENTS

| | | | |
|---|---|---|---|
| 7,693,256 | B2 | 4/2010 | Brahme et al. |
| 2006/0092379 | A1 | 5/2006 | Cho et al. |
| 2010/0322479 | A1* | 12/2010 | Cleveland .......... H04N 5/23296 348/47 |
| 2013/0002952 | A1 | 1/2013 | Nakayama |
| 2014/0036406 | A1 | 2/2014 | Tesson et al. |
| 2014/0152794 | A1 | 6/2014 | Takahashi |
| 2014/0192407 | A1* | 7/2014 | Greenberg .......... G02B 21/086 359/385 |
| 2014/0333751 | A1* | 11/2014 | Takayama ............. G09G 5/14 348/79 |

FOREIGN PATENT DOCUMENTS

| | | |
|---|---|---|
| EP | 0845693 A1 | 6/1998 |
| WO | 201213233 A1 | 10/2012 |

OTHER PUBLICATIONS

International Search Report of the International Searching Authority corresponding to International Patent Application No. PCT/EP2017/051414 dated Jul. 14, 2017. (9 pages).

Liu et al. "Real-time brightfield, darkfield, and phase contrast imaging in a light-emitting diode array microscope" Journal of Biomedical Optics 19(10):106002 (Oct. 2014).

"Rejection Decision and English language translation", CN Application No. 201780009806.9, dated Jun. 8, 2021, 15 pp.

Office Action with English translation corresponding to Chinese Patent Application No. 2017800098069 (18 pages) (dated Mar. 25, 2020).

* cited by examiner

METHOD AND DEVICES FOR DISPLAYING STEREOSCOPIC IMAGES

BACKGROUND

The present application relates to methods and apparatuses for presenting stereo images, particularly in microscope apparatuses or other optical apparatuses.

Apparatuses for stereo imaging, also referred to as stereo recording systems, impart a three-dimensional impression of an observed object. Examples to this end include stereo microscopes, in which a three-dimensional impression of a microscoped specimen is imparted. By way of example, in conventional, purely optical solutions, a dedicated beam path is provided to this end for each eye of a human observer. Each of the two beam paths cuts out different parts of the objective pupil, and so the two beam paths bring about imaging of the object from different directions.

Various conventional approaches for purely optical stereo microscopy are presented in a product brochure "Spatial Image Microscopy" by Carl Zeiss Microscopy or in EP 0730 181 A2.

SUMMARY

It is an object of the present application to provide methods and apparatuses for presenting stereo images which, in particular, use digital possibilities for presenting stereo images.

In accordance with a first aspect, a method for presenting stereo images is provided, including recording a plurality of images of an object, wherein an image-recording parameter is varied over the plurality of images, and calculating a first result image and a second result image, wherein at least two images of the plurality of images are combined in each case for calculating the first result image and the second result image, wherein the first result image and the second result image form a stereo image pair for presenting stereo images. It should be noted that the at least two images for the first and second result image can be, wholly or partly, the same images. By way of example, the plurality of images may only comprise a total of two images in some embodiments, said two images then being used both for calculating the first result image and for calculating the second result image.

By calculating the two result images on the basis of a combination of images, it is possible, for example, for a beam path to have a simplified design compared to a purely optical solution since, for example, the same image portion can be recorded with one camera device for all images.

The method may further include displaying the first result image for a left eye of a user and the second result image for a right eye of the user.

The image-recording parameter may comprise a focal plane such that the plurality of images are recorded with different defocusing.

The result images can be calculated efficiently by changing the focus.

The image-recording parameter may comprise an illumination direction such that the plurality of images are recorded from different illumination directions.

As result of this, the result images can be calculated with different parameters.

In this case, determining the first and second result image may include calculating a first phase-contrast image, which has an increased phase contrast in a first direction, and a second phase-contrast image, which has an increased phase contrast in a second direction that differs from the first direction, on the basis of the plurality of images, and calculating the first and second result image on the basis of the first and second phase-contrast image.

Recording the plurality of images may include recording a first plurality of images with illumination directions in a first illumination direction range and recording a second plurality of images with illumination directions in a second illumination direction range that differs from the first illumination direction range, wherein the first result image is calculated on the basis of the first plurality of images and the second result image is calculated on the basis of the second plurality of images.

In this way, it is possible to predetermine a stereo perspective by the illumination direction ranges, while various image improvements are facilitated by recording the first and second plurality.

The first result image and the second result image can be calculated as a phase-contrast image in each case. Thus, other types of images are also possible in addition to the "conventional" presentation of stereo images with intensity images.

Such a method may further include predetermining an observation perspective, wherein the first and second result image is determined on the basis of the observation perspective.

This allows a perspective of the overall observation to be selected freely within certain boundaries.

The method may additionally include predetermining a stereo angle, wherein determining the first and second result image is effected in such a way that the perspectives of the first and the second result image differ by the predetermined stereo angle.

By way of example, this allows the stereo angle to be matched to a pupil spacing of an observer.

Perspectives of the first result image and of the second result image can differ by an angle that lies between 11° and 16°.

Such an angle corresponds to the convergence angle in the case of near accommodation and consequently facilitates a natural visual impression.

The method can further include carrying out a digital image improvement on the plurality of images, the first result image and/or the second result image.

Thus, conventional methods of digital image processing can be easily integrated.

According to a second aspect, an apparatus is provided, comprising an image-recording device for recording a plurality of images of an object, wherein the image-recording device is configured to vary an image-recording parameter over the plurality of images, and a computing device for determining a first result image and a second result image on the basis of the plurality of images, wherein at least two images of the plurality of images are combined in each case for the first result image and the second result image such that the first result image and the second result image form a stereo image pair.

This apparatus substantially corresponds to the method of the first aspect.

In particular, the image-recording device can comprise a microscope device.

The apparatus can further comprise a stereoscopic display apparatus for displaying the first result image for a left eye of an observer and the second result image for a right eye of an observer.

The apparatus can be configured to carry out one of the above-described methods.

According to a third aspect, a method is provided, including recording a first image of an object with a first illumination direction and a second image of the object with a second illumination direction that differs from the first illumination direction using at least one image sensor, and displaying the first image for a left eye of an observer and the second image for a right eye of the observer.

Thus, a stereo image pair can be provided without significant calculations.

This method may further include carrying out a digital image improvement on the first image and the second image prior to the display.

Thus, conventional methods of digital image processing can be easily integrated.

According to a fourth aspect, an apparatus is provided, comprising an image-recording device for recording a first image of an object with a first illumination direction and a second image with a second illumination direction, and display device for displaying the first image for a left eye of the observer and the second image for a right eye of the observer.

This apparatus corresponds to the method of the third aspect.

This apparatus may further comprise a computing device for carrying out a digital image improvement on the first image and/or the second image.

BRIEF DESCRIPTION OF THE DRAWINGS

The invention is explained in more detail below on the basis of exemplary embodiments. In the figures.

DETAILED DESCRIPTION

Various exemplary embodiments are explained in greater detail below with reference to the accompanying drawings. These exemplary embodiments serve merely for illustration and should not be interpreted as restrictive. By way of example, a description of an exemplary embodiment with a plurality of features or elements should not be interpreted to the effect that all these features or elements are necessary for implementing exemplary embodiments. Rather, other exemplary embodiments may have alternative features or elements and/or fewer features or elements than the illustrated and described exemplary embodiments. Moreover, additional features or elements, in particular conventional features or elements that are used in image-recording apparatuses and microscope apparatuses, can be provided, even if these are not explicitly described below or presented in the figures.

Features of different exemplary embodiments can be combined with one another, unless indicated otherwise. Variations and modifications which are described for one of the exemplary embodiments may also be applicable to other exemplary embodiments.

A plurality of images of an object are recorded in the exemplary embodiments described below. A recording parameter, for example a focal plane or an illumination direction, is varied in the process. In one aspect, two result images then are calculated on the basis of the images recorded thus, said result images then being displayed as a stereo image pair. Below, this concept will be explained in more detail with reference to FIGS. 1-4, wherein an image focus is varied as image-recording parameter in the case of FIGS. 1 and 2 and an illumination direction is varied as an image-recording parameter in the case of FIGS. 3 and 4. According to another aspect, the illumination direction is the illumination parameter that is varied and two images that were recorded from different illumination directions are displayed directly as a stereo image pair. This aspect is explained in greater detail with reference to FIG. 5. Finally, exemplary images that can be produced using apparatuses according to exemplary embodiments are explained with reference to FIGS. 6 and 7.

Figure 1:
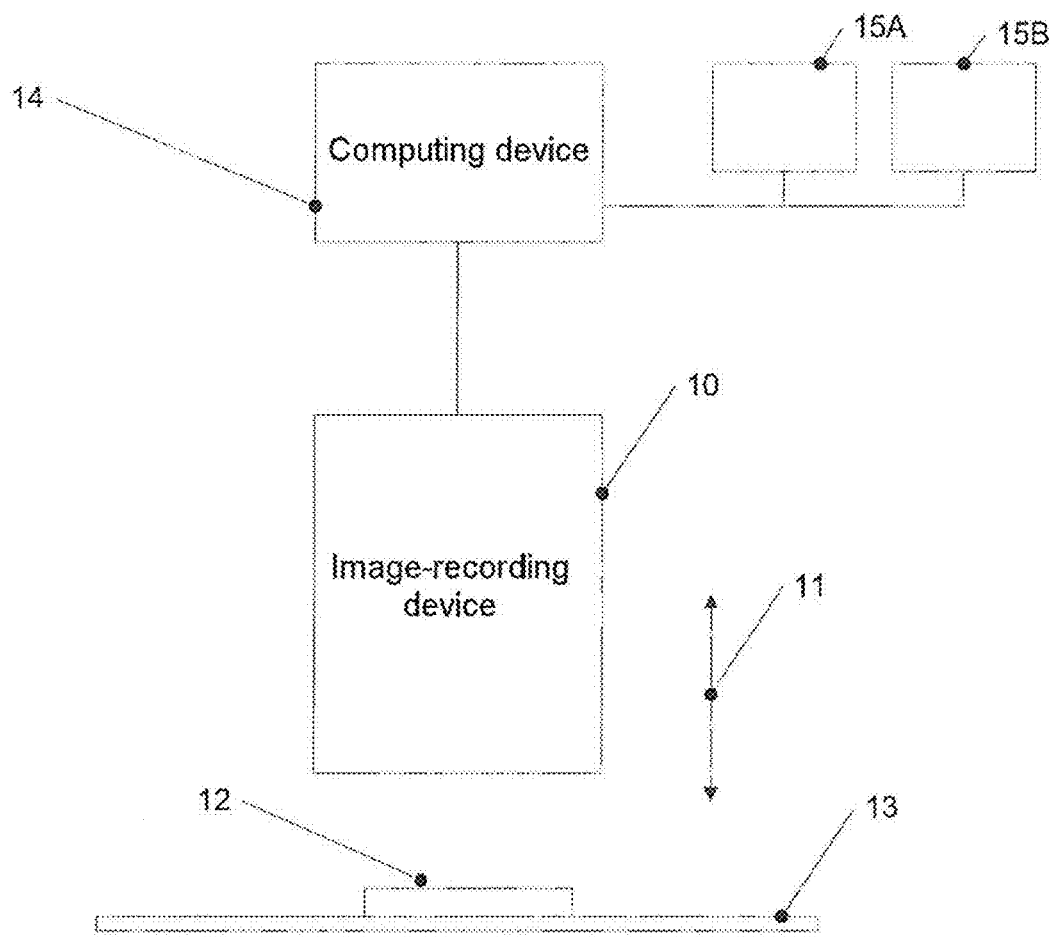
FIG. 1 is a schematic illustration of an apparatus according to one exemplary embodiment.

FIG. 1 presents an apparatus for presenting stereoscopic images according to one exemplary embodiment. The apparatus of FIG. 1 comprises an image-recording device 10 for recording images of a specimen 12, which is arranged on a specimen carrier 13. To this end, the image-recording device 10 can comprise a suitable optical unit and an image sensor, for example a CMOS sensor or a CCD sensor, for image recording purposes. In one exemplary embodiment, the image-recording device 10 is configured as a microscope and a microscope image of the specimen 12 (or of a section thereof) can be recorded then by way of a suitable image sensor. By way of example, such a microscope can be configured as a light microscope and/or as an inverted microscope and can serve medical diagnostic purposes or material examination purposes, for example, without, however, being restricted thereto.

As indicated by an arrow 11, a focal plane of the optical unit can be modified in the process, and so it is possible to record images with different focus settings, in particular different defocusing. By way of example, this can be effected by moving optical components relative to one another or by moving parts of the image-recording device 10 in the direction of the arrow 11 (referred to as z-direction below, i.e., a direction perpendicular to a surface of the carrier 13) relative to the specimen 12. In this way, it is possible to sequentially record a plurality of images with different focal settings (also referred to as a defocus stack).

It is also possible to use other options for producing different defocusing for recording the images. By way of example, the focus in the z-direction can be modified by means of a deformable mirror. Here, a quick change of focus is possible.

In other exemplary embodiments, two or more beam paths with different focal planes, in particular different defocusing, can also be produced by means of a beam splitter. These can then be used for simultaneous image recordings, for example by different parts of an image sensor or by different image sensors. This approach is also known as multifocal microscopy. Diffractive approaches can also be used, for example diffractive multifocal microscopy. Here, different defocusing is produced on a sensor by means of a diffractive element. This approach is described in, e.g., Nature Methods 10, pages 60-63 (2013). Thus, different approaches are possible here for as long as a plurality of images can be recorded with different focal planes, in particular different defocusing. In particular, the image recording with the image-recording device 10 can be carried out essentially with any camera that has a sufficiently low depth of field such that it is possible to record images with different defocusing.

Then, the recorded images are supplied to a computing device 14 for processing purposes. By way of example, in this case, the computing device 14 can be a conventional, appropriately programmed computer, a different type of digital signal processing, for example by means of digital signal processors, or else a logic implemented by means of, or partly by means of, specific hardware (for example, with application-specific integrated circuits, ASICs). In general, any suitable combination of hardware, firmware and software can be used to implement suitable image processing.

The computing device 14 then calculates two result images with different perspectives from the recorded images, in particular by combining the images. Here, the same images can be combined in each case (with different calculations) to make the result images, or it is possible to use wholly or partly different images. In the case of a preferred exemplary embodiment, the two perspectives of the two result images differ by approximately 11° to 16° in this case, corresponding to a convergence angle of the eyes in the case of near accommodation at approximately 25 cm. The exact value can be selected depending on a pupil spacing of a user of the apparatus, for example. Calculating the result images with different perspectives can be effected, for example, as described in Orth, Crozier, Optics Letters 38 No. 15, 2666 (2013), "Light Field Moment Imaging". Alternative approaches are described in Mousnier, Vural, Guillemot, "Partial Light Field Tomographic Reconstruction from a Fixed-Camera Focal Stack", submitted to IEEE Trans. on Image Processing or in Birklbauer, Bimber. Proceedings of Eurographics (Computer Graphics Forum) 31(2), 295-303, 2012, "Light-Field Retargeting".

The images calculated thus are then presented on a display device for a left and a right eye of an observer. In FIG. 1, this display device is symbolized by a left display 15A and a right display 15B. By way of example, the displays 15A, 15B can be realized by means of suitable displays, for example TFT displays or OLED displays, which can be observed through an appropriate optical unit. The displays 15A, 15B can be configured as a digital eyepiece, as a head-mounted display (HMD) device, as a 3D monitor or as video glasses/smartglasses. There can also be a display on a plurality of display apparatuses such that the images can be observed simultaneously by a plurality of persons (digital co-observation). This observation device can be implemented in one appliance, for example a microscope set up, with the image-recording device 10 and, optionally, the computing device 14. However, the result images also can be transmitted and observed at a distance from the image-recording device 10. Here, the observation can be carried out in real-time or else with a time offset.

Figure 2:
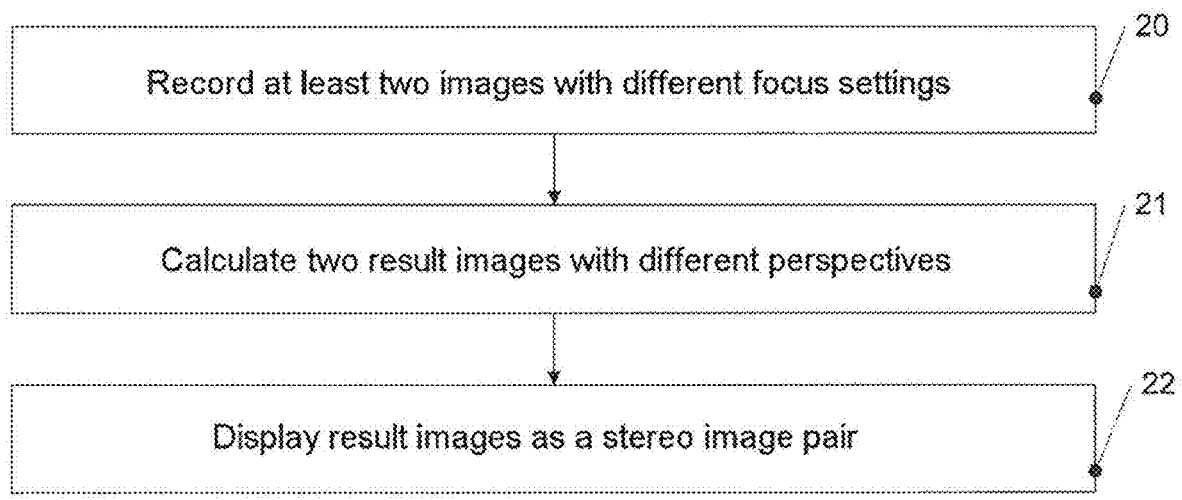
FIG. 2 is a flow diagram for elucidating a method according to one exemplary embodiment.

FIG. 2 presents a corresponding method, which can be carried out in the apparatus of FIG. 1, for example. Details, developments and variants, which were described with reference to FIG. 1, are also applicable to the method of FIG. 2. In order to avoid repetition, such details are not repeated again in the following description of FIG. 2.

In a step 20 of the method of FIG. 2, at least two images are recorded with different focus settings, in particular with different defocusing. Then, two result images with different perspectives are calculated from these images in step 21, wherein two or more images of the at least two images of step 20 can be combined with one another, i.e., combined by calculation, in particular for calculating one of the result images. Then, the result images are displayed as a stereo image pair in step 22, for example as explained for FIG. 1, displays 15A and 15B.

The approach of FIGS. 1 and 2 can have various advantages over conventional stereo microscopes. By way of example, no double beam path is necessary; instead, the images with different defocusing can be recorded sequentially in a single beam path. This allows a simpler optical unit.

Moreover, the entire objective pupil of an employed objective can be used for imaging purposes in such a case, and so a higher resolution can be obtained in some exemplary embodiments than in the case of conventional stereo microscopes. Moreover, the stereo effect can be activated and deactivated. For deactivation purposes, an image with normal focusing simply can be presented on both displays 15A, 15B of FIG. 1, for example. Moreover, as a result of digital images being used, the images can also be prepared in a different way prior to the display in the display device, for example by way of distortion correction, sharpening, denoising or other conventional image processing measures.

Figure 3:
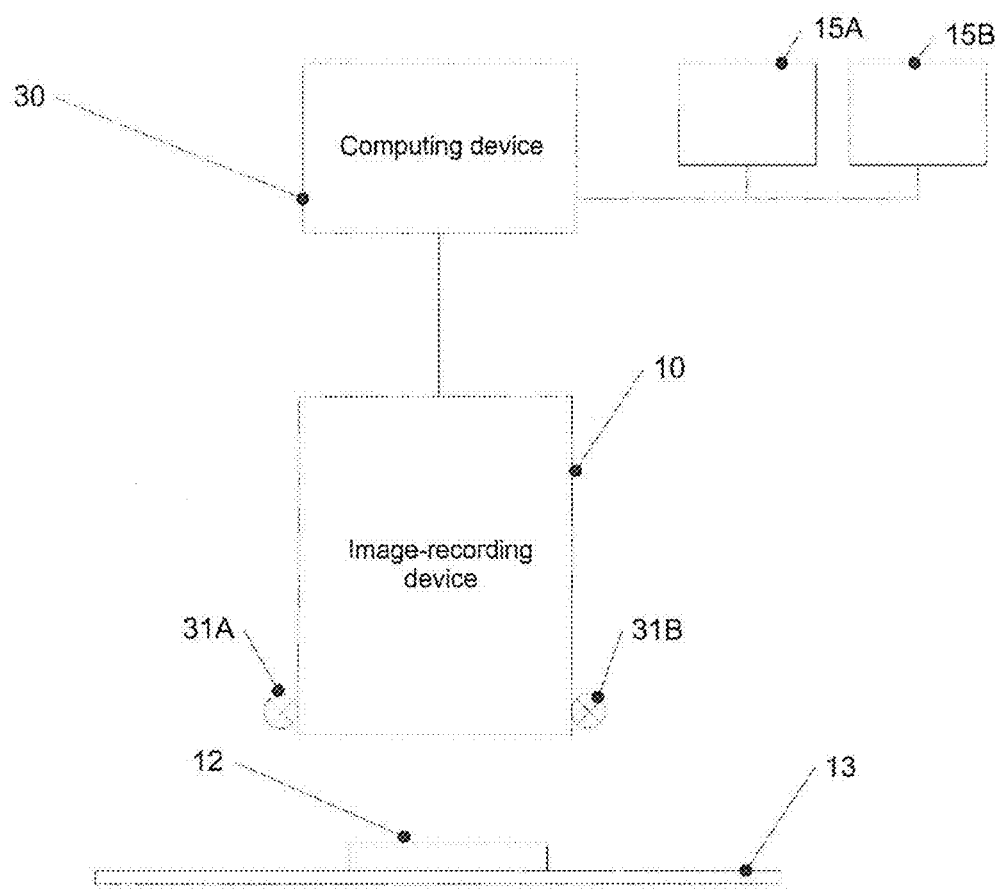
FIG. 3 is a schematic illustration of an apparatus according to a further exemplary embodiment.
Figure 4:
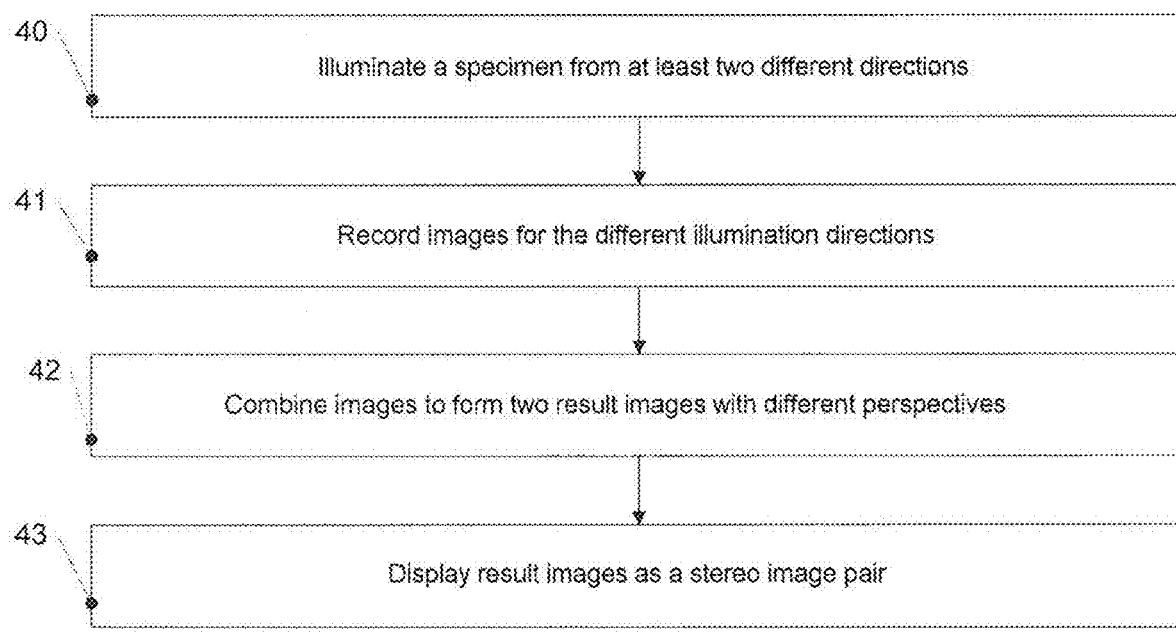
FIG. 4 shows a flow diagram for elucidating a method according to a further exemplary embodiment.

Next, as explained above, a further option, in which an illumination direction instead of the focus is varied between a plurality of image recordings, is discussed with reference to FIGS. 3 and 4. FIG. 3 shows a corresponding apparatus and FIG. 4 shows an associated method. Here, FIG. 3 is based on FIG. 1 and elements that correspond to one another, or are similar, are denoted by the same reference signs. In particular, a specimen 12 is provided on a carrier 13 in the exemplary embodiment of FIG. 3, too, and a plurality of images of the specimen are recorded by means of an image-recording device 10. In contrast to FIG. 1, it is not the focal plane but the illumination direction that is varied between the plurality of images in the exemplary embodiment of FIG. 3. Here, the focus can always remain the same, for example in such a way that at least regions of interest of the specimen 12 are recorded in focus.

Here, the different illumination directions can be realized by a suitable illumination device. By way of example, light sources can be arranged around the image-recording device 10, said light sources being selectively activatable and consequently facilitating an illumination from different directions. As an example, two light sources 31A, 31B are shown in FIG. 3. Here, depending on the available space, any number of such light sources can be arranged around an objective of the image-recording device 10, for example, e.g., in a circular form. Preferably, a plurality of pairs of opposing light sources (light sources 31A and 31B are an example of one such pair), in particular, are provided. By way of example, such light sources can be light-emitting diodes. In other exemplary embodiments, it is also possible to provide areal light sources around the image-recording device 10, for example an areal OLED (organic light-emitting diode) display, of which individual segments are selectively actuatable in order to produce an illumination from different directions.

A result image for the left eye and a result image for the right eye then are produced in the computing device 30 by combining the individual images from the plurality of images recorded thus and the result images then are displayed on a display device once again symbolized by displays 15A and 15B, like in FIG. 1. The display can be effected in real-time or else with a time offset, as already discussed with reference to FIG. 1. In the case of conventional stereo microscopes, an optical system is realized in this case, as a rule, in which two spaced apart eyepiece pupils image parts of the imaging pupil. To this end, the imaging pupil must be dimensioned such that both eyepiece pupils are filled. To this end, a complicated and expensive optical design is often necessary.

A possible approach for calculating the result images will still be explained in more detail below. Beforehand, a corresponding method is presented with reference to FIG. 4. In particular, the method of FIG. 4 can be realized by the apparatus of FIG. 3 and details and developments that were discussed for FIG. 3 or, correspondingly, for FIG. 1 are also applicable to the method of FIG. 4.

In a step 40 of FIG. 4, the specimen is illuminated from at least two different directions, in particular from four different directions. In step 41, at least one image is recorded for each illumination direction in coordination therewith in order to obtain a plurality of images with different illumination directions. In step 42, the images recorded in step 41 then are combined to form two result images with different perspectives. Here, the same images can be combined in each case (with different calculations) to make the result images, or it is possible to use wholly or partly different images. As already explained with reference to FIGS. 1 and 2, the perspectives preferably can differ by an angle of between 11 and 16°, wherein this angle can be adjustable and, for example, can be set depending on a pupil spacing of the user. In step 43, the result images are then displayed as a stereo image pair, corresponding to step 22 of FIG. 2.

Now, an example is explained how a plurality of images that were recorded with different illumination directions, in particular under different illumination angles, can be used to produce two result images, in each case for a left and a right eye of an observer.

In one exemplary embodiment, images illuminated under different angles are recorded here. In particular, two image pairs with in each case opposite illumination directions (i.e., illumination directions offset by 180°) can be recorded, wherein the illumination directions of the two image pairs can be offset by 90°, for example. In the following explanation, the two illumination directions offset by 90° are also referred to as the x- and y-direction.

Then, phase-contrast images are recorded from these images for both directions (axes). By way of example, this calculation can be effected as described in the German patent application DE 10 2014 112 242 or in Z. Liu, L. Tian, S. Liu, L. Waller. Journal of Biomedical Optics 19(10), 106002 (2014). That is to say, one of the two digital phase-contrast images has an increased phase contrast in the x-direction and the other of the two digital phase-contrast images has a high increased phase contrast in the y-direction. Then, the following intensity images are determined with the aid of these digital phase-contrast images.

$$I_{links} = \left(\sum I_{Messungen}\right) \cdot e^{\frac{(-(\tan(-\alpha_x) - DPC_x^2) - (\tan(-\alpha_y) - DPC_y^2))}{\sigma^2}} \quad (1)$$

$$I_{rechts} = \left(\sum I_{Messungen}\right) \cdot e^{\frac{(-(\tan(-\alpha_x) - DPC_x^2) - (\tan(-\alpha_y) - DPC_y^2))}{\sigma^2}} \quad (2)$$

Equations (1) and (2) each relate to a pixel of a result image for a left eye (equation (1)) and for a right eye (equation (2)) and corresponding calculations are carried out for each pixel of the result images. Here, $I_{links}$ denotes the intensity of the result image for the left eye and $I_{rechts}$ denotes the intensity of the result image for the right eye. In the case of color images, the calculations can be carried out separately for each color channel.

$\Sigma I_{Messungen}$ denotes the sum of the intensities of all recorded images for the respective pixel. $\sigma$ is an empirically determined parameter, by means of which an image impression can be modified. $DPC_x$ denotes the value of the digital phase-contrast image in the x-direction for the respective pixel and $DPC_y$ denotes the corresponding value of the phase-contrast image in the y-direction. $\alpha$ is the stereo angle between the two result images, with components $\alpha_x$ and $\alpha_y$, tan denotes the tangent function. These images then can be displayed on a suitable display device, as explained with reference to FIGS. 1 and 3. "Normal" intensity images are produced by the amplitude factor $\Sigma I_{Messungen}$. Other types of stereo image pairs, e.g., phase-contrast stereo image patterns, can be produced in other exemplary embodiments, for example by instead using an amplitude factor on the basis of the phase-contrast images or other types of images.

Moreover, a stereoscopic change in perspective can be introduced in this calculation; i.e., the entire stereo image can be observed from a certain perspective (direction). If the change in perspective is specified by an angle $\rho$ with components $\beta_x$ and $\beta_y$, the following equations (3) and (4) then arise for calculation purposes instead of equations (1) and (2) above:

$$I_{links} = \left(\sum I_{Messungen}\right) \cdot e^{\frac{\left(\begin{array}{c}-(\tan(-\alpha_x + \beta_x) - DPC_x^2) - \\ (\tan(-\alpha_y + \beta_y) - DPC_y^2)\end{array}\right)}{\sigma^2}} \quad (3)$$

$$I_{rechts} = \left(\sum I_{Messungen}\right) \cdot e^{\frac{\left(\begin{array}{c}-(\tan(-\alpha_x + \beta_x) - DPC_x^2) - \\ (\tan(-\alpha_y + \beta_y) - DPC_y^2)\end{array}\right)}{\sigma^2}} \quad (4)$$

Thus, an observation angle also can be set and varied by means of equations (3) and (4), retrospectively after the image recording.

The exemplary embodiment of FIGS. 3 and 4 in part offers similar advantages as the exemplary embodiment of FIGS. 1 and 2. By way of example, the optical unit design outlay and hence the costs and the installation space can be reduced in comparison with conventional stereo microscopes. Both the observation angle ($\beta$ in the equations above) and the stereo basis ($\alpha$ in the equations above) are digitally adjustable, both in real-time during the measurement and off-line after the measurement.

Like in the exemplary embodiment of FIGS. 1 and 2, conventional methods of digital image processing, such as denoising, centering, distortion correcting, sharpening and the like, are applicable in this case too. Moreover, the method can be undertaken with other techniques in which a plurality of recordings are recorded with different illumination directions. By way of example, a reflection suppression can be carried out as described in DE 10 2014 113 256, an image improvement can be carried out, for example in respect of contrast, edge steepness or sharpness, as described in DE 10 2014 113 258, a distortion correction can be carried out as described in DE 10 2013 112 648 or a depth of field can be increased as described in DE 10 2015 107 517. Here, a real-time capability is easier to realize in the exemplary embodiment of FIGS. 3 and 4 than in the exemplary embodiment of FIGS. 1 and 2 since, depending on the implementation, a change in the illumination direction, for example, can be carried out more quickly by an appropriate actuation of light sources than different focusing.

Figure 5:
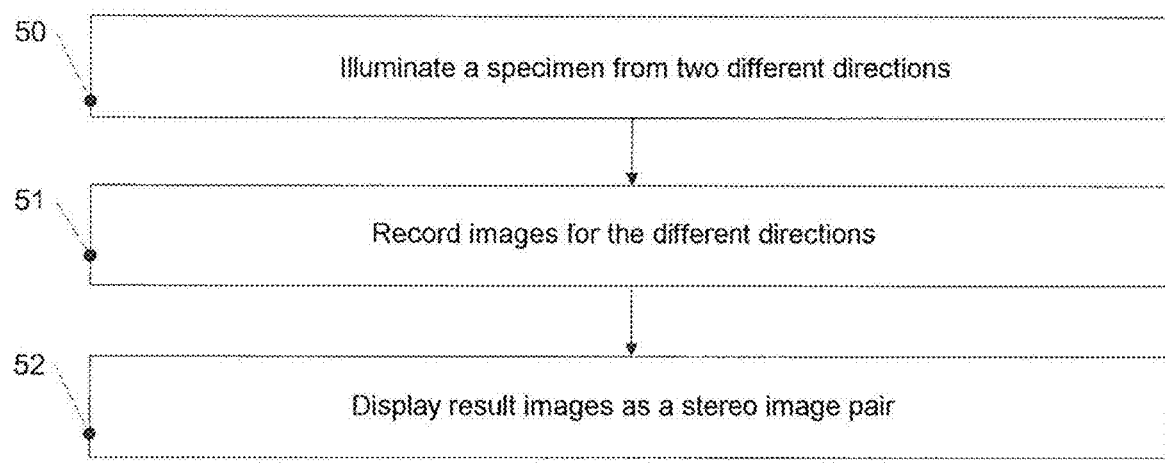
FIG. 5 shows a flow diagram for elucidating a method according to a further exemplary embodiment.

FIG. 5 illustrates a method according to a further exemplary embodiment. Once again, the exemplary embodiment of FIG. 5 can be carried out by means of the apparatus of FIG. 3. Similar to step 40 of the method of FIG. 4, the specimen is illuminated from two different directions, in particular from opposite directions (i.e., directions that differ by 180°) in a step 50 of FIG. 5. Images are recorded for the two different directions in agreement therewith in step 51. In step 52, these two images then are displayed as a stereo image pair.

Thus, in contrast to the method of FIG. 4, there is no combination by calculation or combination of the images with one another in the method of FIG. 5 in order to produce the result images; instead, the recorded images are used as a stereoscopic image pair. What is exploited here is that the light rays from the specimen are also incident on the camera device from different directions as a result of the illumination from different directions, which corresponds to different observation perspectives. Here, a stereo angle is determined by the arrangement of the light sources, which is used for the illumination at 50. Here, too, there can be, however, digital post-processing of the recorded images by conventional measures, such as, for example, denoising, sharpening and the like. Here, the method of FIG. 5 requires less computational capacity than the method of FIG. 4.

On the other hand, the method of FIG. 5 is less flexible than the method of FIG. 4. The procedure of FIG. 5 of producing the stereo perspective difference by illumination from different directions also can be combined with recording a plurality of images and combining the plurality of images, as described for the method of FIG. 4. By way of example, illumination can be carried out from the "left" and the "right", i.e., from different individual directions in each case for two different direction ranges, and the images from each side can be combined in order to obtain a result image for the respective side (for example for the respective eye). Expressed differently, a directional range (e.g., left side in FIG. 3 and right side in FIG. 3), for example, can respectively have a plurality of light sources, which are successively activated for recordings of individual images. Thus, a phase-contrast image can be produced in each case by such a combination, and so, ultimately in that case, a phase-contrast stereo image is produced from two individual images. Additionally, or alternatively, other image modifications also can be produced by combining the individual images, as already described above (for example, improvements in respect of contrast, edge steepness or sharpness, distortion correction or increased depth of field).

Figure 6:
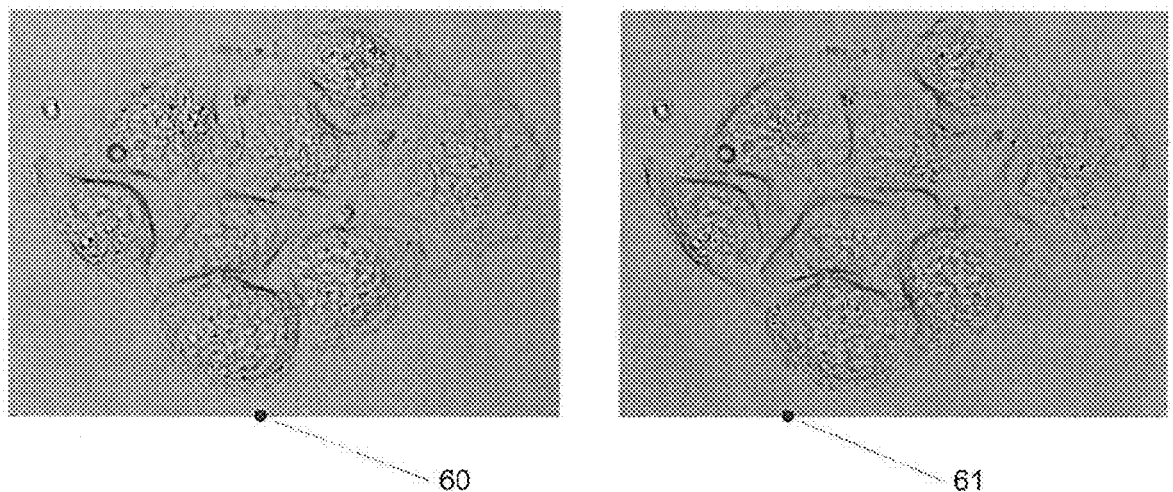
FIG. 6 shows exemplary images that are producible by exemplary embodiments.

Now, exemplary images, as are obtainable with the apparatuses and methods, as discussed with reference to FIGS. 1-4 in particular, in which a plurality of images are combined by calculation to form result images, are still discussed with reference to FIGS. 6 and 7 for further elucidation purposes. Here, FIGS. 6 and 7 each show images of a cell culture. In FIG. 6, 60 denotes a result image for a left eye and 61 denotes a result image for a right eye. The images differ in respect to the perspective, and so a stereo image impression arises upon observation with a suitable display device.

Here, images underlying the result images were recorded with a 40× magnification and a numerical aperture of 0.6 in the example of FIG. 6.

Figure 7:
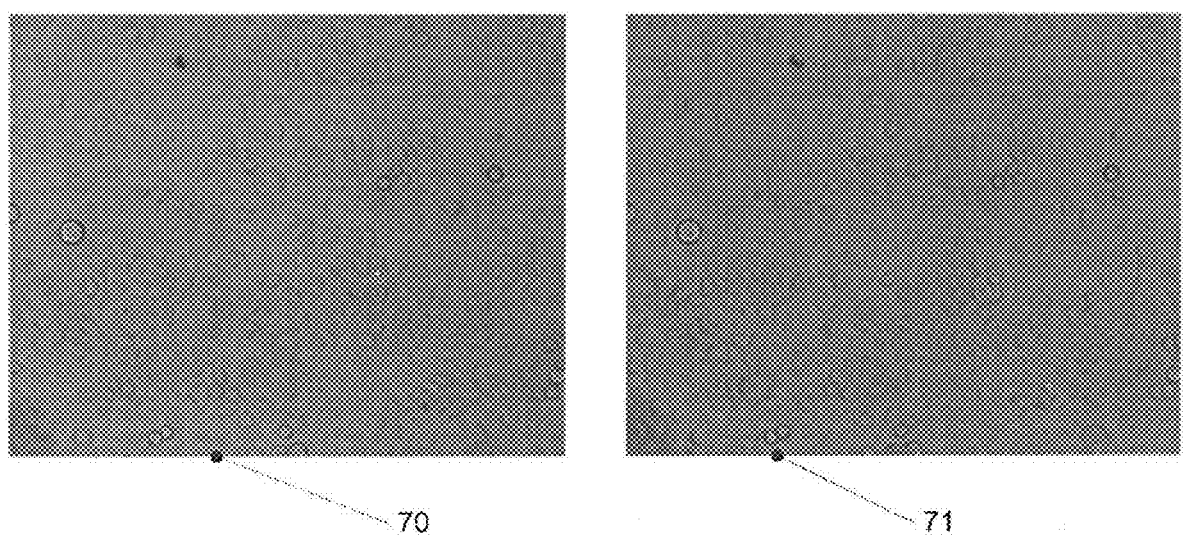
FIG. 7 shows further exemplary images, as are producible by exemplary embodiments.

A cell culture was likewise recorded in FIG. 7, and 70 denotes a result image for a left eye and 71 denotes a result image for a right eye. The magnification of the initially recorded images, on the basis of which the result images of FIG. 7 were calculated, was 20× and the numerical aperture was 0.8. As can be seen, images with different perspectives can in fact be calculated using the presented apparatuses and methods. These images only serve elucidation purposes and the images can vary depending on the desired stereo angle and recorded object.

The invention claimed is:

1. A method for presenting stereo images, comprising:
recording a plurality of images of an object by an image-recording device, wherein an image-recording parameter is varied over the plurality of images,
determining a first result image and a second result image by a computer device, wherein at least two images of the plurality of images are combined in each case for calculating the first result image and the second result image, wherein the first result image and the second result image form a stereo image pair for presenting stereo images,
wherein the image-recording parameter comprises an illumination direction such that the plurality of images are recorded with different illumination directions, and
wherein determining the first result image and the second result image comprises:
calculating a first phase-contrast image, which has an increased phase contrast in a first direction, and a second phase-contrast image, which has an increased phase contrast in a second direction that differs from the first direction, based on the plurality of images;
calculating the first result image based on the first phase-contrast image and the second phase-contrast image; and
calculating the second result image based on the first phase-contrast image and the second phase-contrast image.

2. The method of claim 1, further comprising:
displaying the first result image for a left eye of a user and the second result image for a right eye of the user.

3. The method of claim 1, wherein the image-recording parameter comprises a focal plane such that the plurality of images are recorded with different defocusing.

4. The method of claim 1, further comprising:
predetermining an observation perspective, wherein the first and second result image is determined on the basis of the observation perspective.

5. The method of claim 1,
wherein recording the plurality of images comprises recording a first plurality of images with illumination directions in a first illumination direction range and recording a second plurality of images with illumination directions in a second illumination direction range that differs from the first illumination direction range, and
wherein the first result image is calculated on the basis of the first plurality of images and the second result image is calculated on the basis of the second plurality of images.

6. The method of claim 1,
wherein the first result image and the second result image are calculated as a phase-contrast image in each case.

7. The method of claim 1, further comprising:
predetermining a stereo angle, wherein determining the first and second result image is effected in such a way that the perspectives of the first and the second result image differ by the predetermined stereo angle.

8. The method of claim 1, wherein perspectives of the first result image and of the second result image differ by an angle which lies between 11° and 16°.

9. The method of claim 1, further comprising carrying out a digital image improvement on the plurality of images, the first result image and/or the second result image.

10. An apparatus, comprising:
- an image-recording device for recording a plurality of images of an object, wherein the image-recording device is configured to vary an image-recording parameter over the plurality of images, and
- a computing device for determining a first result image and a second result image on the basis of the plurality of images, wherein at least two images of the plurality of images are combined in each case for the first result image and the second result image such that the first result image and the second result image form a stereo image pair,
- wherein the image-recording parameter comprises an illumination direction such that a multiplicity of images are recorded with different illumination directions, and
- wherein determining the first result image and second result image comprises:
    - calculating a first phase-contrast image, which has an increased phase contrast in a first direction, and a second phase-contrast image, which has an increased phase contrast in a second direction that differs from the first direction, based on the multiplicity of images;
    - calculating the first result image based on the first phase-contrast image and the second phase-contrast image; and
    - calculating the second result image based on the first phase-contrast image and the second phase-contrast image.

11. The apparatus of claim 10, wherein the image-recording device comprises a microscope device.

12. The apparatus of claim 10, further comprising a stereoscopic display apparatus for displaying the first result image for a left eye of an observer and the second result image for a right eye of an observer.

13. The apparatus of claim 10,
- wherein the image-recording parameter comprises an illumination direction such that a multiplicity of images are recorded with different illumination directions, and
- wherein recording the multiplicity of images comprises recording a first multiplicity of images with illumination directions in a first illumination direction range and recording a second multiplicity of images with illumination directions in a second illumination direction range that differs from the first illumination direction range, wherein the first result image is determined on the basis of the first multiplicity of images and the second result image is determined on the basis of the second multiplicity of images.

14. The method of claim 1, wherein the first result image and the second result image comprise intensity images.

15. The apparatus of claim 10, wherein the first result image and the second result image comprise intensity images.

* * * * *

UNITED STATES PATENT AND TRADEMARK OFFICE
CERTIFICATE OF CORRECTION

PATENT NO. : 11,442,263 B2  
APPLICATION NO. : 16/074247  
DATED : September 13, 2022  
INVENTOR(S) : Husemann et al.

Page 1 of 1

It is certified that error appears in the above-identified patent and that said Letters Patent is hereby corrected as shown below:

In the Specification

Column 8, Line 22: Please correct "angle $\rho$ with" to read --angle $\beta$ with--

Signed and Sealed this  
Tenth Day of January, 2023

Katherine Kelly Vidal  
*Director of the United States Patent and Trademark Office*